April 27, 1948. M. MENNESSON 2,440,483
CONTROL DEVICE FOR INTERNAL-COMBUSTION ENGINES
Filed March 2, 1945
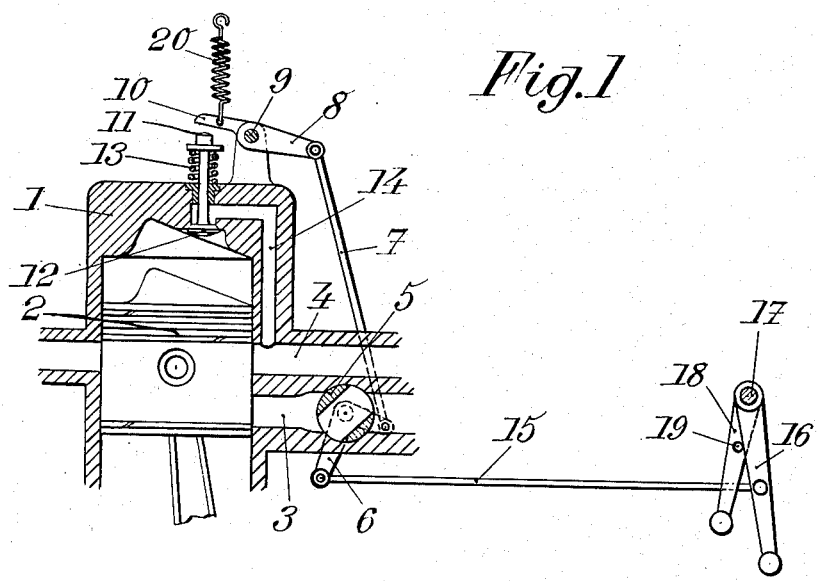
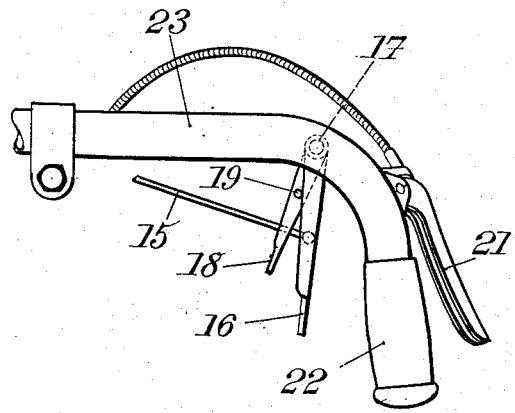
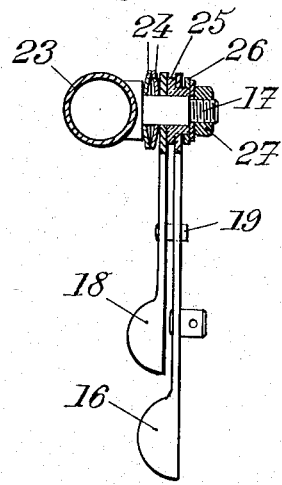
INVENTOR
MARCEL MENNESSON
BY
ATTORNEY Patented Apr. 27, 1948

2,440,483

UNITED STATES PATENT OFFICE 2,440,483

CONTROL DEVICE FOR INTERNAL-COMBUSTION ENGINES

Marcel Mennesson, Neuilly-sur-Seine, France, assignor to Societe D'Appareils de Contrôle et Equipement des Moteurs (S. A. C. E. M.), Neuilly-sur-Seine (Seine), France, a society of the French Republic Application March 2, 1945, Serial No. 580,587
In France August 1, 1942

Section 1, Public Law 690, August 8, 1946
Patent expires August 1, 1962

13 Claims. (Cl. 123—97)

The present invention relates to control devices for internal combustion engines provided with means for temporary placing the combustion chamber in constant communication with the atmosphere, and said invention is more especially, although not exclusively, concerned with such devices as applied to driving engines for light vehicles, such as bicycles, motor-cycles and the like.

The object of the present invention is to provide a device of the kind in question such that the operations necessary for bringing the engine out of action, either temporarily or permanently are simplified and made easier, and that the working of the engines, under these conditions, is more economical and more rational.

According to a first feature of the present invention, I provide means for conjugating the fuel intake device control, in an engine of the kind above referred to, with the means for temporarily placing the combustion chamber in constant communication with the atmosphere, said conjugating means being so devised that when the fuel intake control is moved in the direction for which the intake is reduced, the closing, either total or nearly so, of this intake is followed by the placing of the combustion chamber into communication with the atmosphere.

According to another feature of the present invention, the means for controlling the fuel intake and the means for placing the combustion chamber in communication with the atmosphere, conjugated as above stated are arranged in such manner that they can be actuated through a single operating member, said operating member being located close to the hand of the driver, for instance near one of the handles of the handle bar of the vehicle, when the latter is a bicycle or is provided with steering means analogous to those of a bicycle.

According to still another feature of the present invention, the single control member above referred to is provided with an abutment or stop with which it cooperates, the position of said stop being easily adjustable by the driver, in such manner as to limit at will the displacement of said control member in the direction corresponding to the opening of the fuel intake, and this without interfering with the instantaneous closing of the fuel intake, this adjustable stop being eventually adapted to keep the fuel intake control in a position such that the combustion chamber of the engine is in communication with the atmosphere.

According to still another feature of the present invention, the conjugated control means of the fuel intake and of the means for placing the combustion chamber in communication with the atmosphere are acted upon by a return spring which constantly urges these control means toward the position of total opening of the fuel intake, said spring being preferably arranged in such manner as to take up all the mechanical plays as may take place in said control means.

Other features of the present invention will result from the following detailed description of some specific embodiments thereof.

Preferred embodiments of the present invention will be hereinafter described, with reference to the accompanying drawings, given merely by way of example, and in which:

Fig. 1 is a diagrammatic elevational view, with parts in section, of a portion of an internal combustion engine provided with means for temporarily placing the combustion chamber in constant communication with the atmosphere, this engine being provided with a control device made according to an embodiment of the present invention;

Fig. 2 is a plan view of one half of a bicycle handle-bar on which are mounted on the one hand the operating means of the control device according to the invention, and, on the other hand, the brake lever;

Fig. 3 is a transverse sectional view on an enlarged scale illustrating how the operating means of the control device are mounted on the handle-bar, according to the invention.

In the following description, it will be supposed that the invention is applied to the case of a low powered internal combustion engine intended to be mounted, as auxiliary driving motor, on a light vehicle such as a bicycle or the like.

Concerning the engine proper, it is constituted in any suitable manner, and for instance like those generally employed for this particular use. For instance, this engine is of the conventional two-stroke type. As for the means for temporarily placing the combustion engine in communication with the atmosphere, said means may be constituted, in the usual manner by a stopping means (valve) adapted to be opened, through control means operative from a distance, in such manner as to afford a communication between the combustion chamber and the outside or the exhaust pipe.

The vehicles above considered are generally driven at rather low speeds, due to the low power of the engine. Consequently, the driver generally slows down his vehicle so as to stop it over a certain distance mostly by acting only through the means for placing the combustion chamber in communication with the atmosphere, and without operating the throttle valve. This practice involves a waste of fuel which is perfectly useless since the intake remains fully open. Furthermore, noisy explosions often occur under these conditions.

If the driver is cautious enough to close the gas throttle before operating the means for placing the combustion chamber in communication with the atmosphere, he is compelled to act on two levers (one for the gas the other for said means), which makes it necessary to have two connections with the engine, and this operation generally fully occupies the hand, which however is often necessary for operating the brake.

According to the present invention, these drawbacks are eliminated by judiciously conjugating the means for controlling the gas intake and the means for placing the combustion chamber in communication with the atmosphere, said means being generally actuated by means of a single operating member. When this member is actuated in the direction which corresponds to the closing of the gas intake, it produces first the closing, either total or nearly so, of the gas intake, and, only thereafter, the operation of the means for placing the combustion chamber in communication with the atmosphere, said last mentioned means being brought out of action before the opening of the gas intake when said single operating member is moved in the opposite direction.

The two-stroke engine shown by way of example by Fig. 1 includes a cylinder 1, adapted to work with a pre-compression in the crankcase, a piston 2 with its deflector, at least one inlet port 3 and at least one exhaust port 4. The gas intake is adjusted through a valve 5 such as shown, or of any other suitable type. The control lever 6 of this throttle valve is connected through a transmission, either rigid or flexible, movable either by translation or by rotation (and for instance actuated through a rod 7) to a lever 8 pivoting about an axis 9. This lever 8 is so arranged that its end 10 can act on the stem 11 of a valve 12 or the like which constitutes the means for placing the combustion chamber in communication with the atmosphere. This valve 12 is normally applied against its seat by a spring 13, and when it is opened, it connects the combustion chamber of the engine, through conduit 14, either with the exhaust conduit, as shown by the drawing, or with the outside.

Lever 6 is also connected, through a rod 15, with a lever 16, arranged to turn freely about an axis 17 and placed close to the driver's hand.

A second lever 18 is also mounted on the same axis 17, but with a substantial friction, so that its displacement can be obtained only when the driver exerts a certain effort. On this second lever is provided an abutment or stop 19 located across the path of travel of lever 16. This stop 19 thus limits, in an adjustable manner, the rotation of lever 16 in the direction corresponding to the opening of the throttle valve 5, that is to say in the clockwise direction in the embodiment illustrated by Fig. 1.

A pull spring 20, provided between a fixed point and lever 8, constantly tends to move the end 10 of lever 8 away from the stem 11 of valve 12. Through its action on rods 7 and 15 and on lever 6, this spring applies lever 16 against stop 19, and at the same time takes up all the play as may occur in the various joints.

The working of the control device made as above described takes place as follows:

Lever 16, which controls throttle valve 5 is constantly urged by spring 20 toward a position in which this valve is in its position of maximum opening, which position is adjustable through the stop 19 of lever 18. When the driver wishes to slow down the engine, he moves lever 16 toward the right of Fig. 1, which has for its effect to close the gas intake through rotation of the throttle valve. When this valve is closed, or nearly so, the end 10 of lever 8 comes into contact with the stem 11 of valve 12, and a supplementary effort on lever 16, so as to compress the spring 13 of this valve, causes the latter to open and thus permanently to connect the inside of the cylinder with the exhaust conduit 4.

It is advantageous to provide for a certain angular displacement of control lever 6 during which throttle valve 5 remains closed, the opening of valve 12 being obtained during this displacement.

Therefore, the placing of the combustion chamber in communication with the outside can take place only when the gas intake is closed, either wholly or nearly so. Thus I avoid noisy explosions due to the combustion of the gas and, chiefly, the useless consumption of fuel during periods when no work is required from the engine.

As soon as the driver wishes to increase the speed of the engine, he ceases to act on lever 16 which, under the effect of the action of spring 20, returns into contact with adjustable stop 19 and brings back throttle valve 5 to the full opening position.

The adjustable stop 19 makes it possible to operate the engine at intermediate speeds by limiting the maximum opening of valve 5, which controls the gas intake, and this without in any way interfering with the movement of this throttle valve in the closing direction. Furthermore, this stop 19 makes it possible, if so desired, to stop lever 16 in a position for which valve 12 or the like remains open. This facilitates the movements of the vehicle when the engine is not in action and prevents said engine from opposing any substantial resistance to such movements.

It should be noted that the spring 13 of valve 12 or the like compels the driver to exert a supplementary effort on lever 16, which has the advantage of warning him when the inside of the cylinder is being placed into communication with the outside.

Fig. 2 shows, in a diagrammatic manner, one half of the handle bar of a bicycle or similar vehicle provided with an auxiliary driving motor, or of a light motor-cycle, etc., which has been fitted with the levers 16 and 18 to be operated by the driver for controlling the gas intake and the placing of the inside of the cylinder in communication with the outside, and also for limiting the maximum opening of the throttle valve 5. In the example shown, the axis 17 about which levers 16 and 18 are pivoted is substantially perpendicular to the plane formed by the handle bar and also substantially perpendicular to the axis of the brake operating lever 21.

These levers are located close to the handle 22 of the handle-bar, whereby levers 16 and 18, and especially lever 16, can be easily controlled by the thumb of the driver's hand that rests on said handle. The driver can thus act, simultaneously, with the thumb of this hand, on the lever 16 which controls both the gas intake and the placing of the inside of the cylinder in communication with the outside, and, with the four other fingers of the same hand, on the lever 21 of the brake, whereby he can, if necessary, act with a single hand both on the brake and on the means for bringing the inside of the cylinder in communication with the atmosphere, in order to stop the vehicle. Lever 18, through which the degree of maximum opening of the throttle valve can be adjusted, can also be controlled by the thumb of the driver.

In Fig. 3, I have shown, by way of example, in what manner the two levers 16 and 18 can be mounted on spindle 17, which can be either riveted or welded, or again fixed in any other suitable way to handle bar 23. For this purpose, I slip, in the following order, on said spindle 17, two elastic washers 24, lever 18, a ring 25 provided with a shoulder and on which lever 16 is pivoted, a tightening washer 26 adapted to limit the lateral play of said lever 16, and a fixation nut 27. According to the position of nut 27, I hold lever 18 more or less tightly between ring 25 and washers 24 so as thus to adjust the resistance offered by said lever 18 to a pivoting displacement thereof. On the contrary, lever 16 pivots freely between the shoulder of ring 25 and washer 26.

Of course, the arrangement illustrated by the appended drawings is not the only possible one within the scope of the invention.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A control device for an internal combustion engine comprising at least a cylinder with at least a combustion chamber formed therein, a gas intake for said cylinder, pressure relief means for placing said combustion chamber in communication with the atmosphere, said control device comprising, in combination, throttle means for controlling said gas intake, and interconnecting means between said pressure relief means and said throttle means, adapted to permit the opening of said pressure relief means to the atmosphere only after the closing of said throttle means, and inversely the opening of said throttle means only after said pressure relief means have been closed.

2. A control device for an internal combustion engine comprising at least a cylinder with at least a combustion chamber formed therein, a gas intake for said cylinder, pressure relief means for placing said combustion chamber in communication with the atmosphere, said control device comprising, in combination, throttle means for controlling said gas intake, and interconnecting means between said pressure relief means and said throttle means, adapted to permit the opening of said pressure relief means to the atmosphere only after the closing of said throttle means, and inversely the opening of said throttle means only after said pressure relief means have been closed, and a single control member for operating both of said pressure relief means and said throttle means.

3. A control device for an internal combustion engine comprising, at least, a cylinder with at least a combustion chamber formed therein, a gas intake for said cylinder, a pressure relief valve for placing said combustion chamber in communication with the atmosphere, said control device comprising, in combination, throttle means for controlling said gas intake, interconnecting means between said pressure relief valve and said throttle means adapted to permit the opening of said pressure relief valve only after the closing of said throttle means, and inversely the opening of said throttle means only after the closing of said pressure relief valve, and a single control member for operating both of said pressure relief valve and said throttle means.

4. A control device for an internal combustion engine comprising at least a cylinder with at least a combustion chamber formed therein, a gas intake for said cylinder, pressure relief means for placing said combustion chamber in communication with the atmosphere, said control device comprising, in combination, throttle means for controlling said gas intake, and interconnecting means between said pressure relief means and said throttle means, adapted to permit the opening of said pressure relief means to the atmosphere only after the closing of said throttle means, and inversely the opening of said throttle means only after said pressure relief means have been closed, a single control member for operating both of said pressure relief means and said throttle means, and elastic means for urging said throttle means in the direction corresponding to its opening.

5. A control device for an internal combustion engine comprising, at least a cylinder with at least a combustion chamber formed therein, a gas intake for said cylinder, a pressure relief valve for placing said combustion chamber in communication with the atmosphere, said control device comprising, in combination, throttle means for controlling said gas intake, interconnecting means between said pressure relief valve and said throttle means adapted to permit the opening of said pressure relief valve only after the closing of said throttle means, and inversely the opening of said throttle means only after the closing of said pressure relief valve, and a single control member for operating both of said pressure relief valve and said throttle means, an elastic means for urging said throttle means in the direction corresponding to its opening.

6. A control device for an internal combustion engine comprising at least a cylinder with at least a combustion chamber formed therein, a gas intake for said cylinder, pressure relief means for placing said combustion chamber in communication with the atmosphere, said control device comprising, in combination, throttle means for controlling said gas intake, and interconnecting means between said pressure relief means and said throttle means, adapted to permit the opening of said pressure relief means to the atmosphere only after the closing of said throttle means, and inversely the opening of said throttle means only after said pressure relief means have been closed, and a single control member for operating both of said pressure relief means and said throttle means, elastic means for urging said throttle means in the direction corresponding to its opening, and an adjustable stop for limiting the opening displacement of said throttle means.

7. A control device according to claim 3 which comprises control means for said pressure relief valve and acting on said valve with a certain play.

8. A control device for an internal combustion engine comprising, at least a cylinder with at least a combustion chamber formed therein, a gas intake for said cylinder, a pressure relief valve for placing said combustion chamber in communication with the atmosphere, said control device comprising, in combination, a lever for opening said valve, throttle means for controlling said gas intake, interconnecting means between said lever and said throttle means adapted to permit the opening of said pressure relief valve by said lever only after the closing of said throttle means, and, inversely, the opening of said throttle means only after the closing of said pressure relief valve, and a single control member for operating both of said throttle means and said lever.

9. A control device according to claim 8 in which said lever is connected directly to said throttle means.

10. A control device according to claim 8 and comprising spring means for resiliently opposing the opening action of said lever on said pressure relief valve.

11. A control device according to claim 8 and comprising spring means for urging said pressure relief valve toward the closed position thereof, so as to oppose a supplementary resistance to the movement of said control member in the direction corresponding to the opening of said pressure relief valve.

12. A control device according to claim 8 and comprising spring means for resiliently opposing the opening action of said lever on said pressure relief valve and other spring means urging said pressure relief valve toward the closed position thereof, so as to oppose a supplementary resistance to the displacement of said lever in the direction corresponding to the opening of said pressure relief valve.

13. In combination, an internal combustion engine, comprising a cylinder with a combustion chamber formed therein, a gas intake for said cylinder, a pressure relief valve for said cylinder, for placing said chamber in communication with the atmosphere, a control device comprising, in combination, throttle means for controlling said gas intake, interconnecting means between said pressure relief valve and said throttle means adapted to permit the opening of said pressure relief valve only after the closing of said throttle means, and, inversely, the opening of said throttle means only after the closing of said pressure relief valve, a single control lever, pivoted to a fixed part, for operating both said pressure relief valve and said throttle means, another lever pivoted, coaxially with said control lever, to said fixed part with a certain friction to keep it in the angular position it is given with respect to said part, and a stop carried by said second lever for limiting the displacements of said control lever in the direction corresponding to the opening of said throttle means.

MARCEL MENNESSON.

REFERENCES CITED

The following references are of record in the file of this patent:

UNITED STATES PATENTS

| Number | Name | Date |
|---|---|---|
| 1,319,627 | Sentiuella | Oct. 21, 1919 |
| 1,599,552 | Chisholm | Sept. 14, 1926 |
| 2,237,581 | Schwinn | Apr. 8, 1941 |

FOREIGN PATENTS

| Number | Country | Date |
|---|---|---|
| 203,926 | Great Britain | Sept. 20, 1923 |